United States Patent [19]

Barabas et al.

[11] 4,128,520

[45] Dec. 5, 1978

[54] THICKENING BUTADIENE-STYRENE LATICES WITH TERPOLYMER EMULSIONS

[75] Inventors: Eugene S. Barabas, Watchung; Andrew Klein, Somerville; Dru W. Alwani, Wayne, all of N.J.

[73] Assignee: GAF Corporation, New York, N.Y.

[21] Appl. No.: 770,197

[22] Filed: Feb. 18, 1977

[51] Int. Cl.$^2$ ............................................. C08L 9/08
[52] U.S. Cl. ..................... 260/29.7 W; 260/29.6 TA
[58] Field of Search .................. 260/29.7 W, 29.6 TA

[56] References Cited

U.S. PATENT DOCUMENTS

| 3,035,004 | 5/1962 | Glavis | 260/29.6 RW |
|---|---|---|---|
| 3,401,134 | 9/1968 | Fantl et al. | 260/29.7 W |
| 3,657,175 | 4/1972 | Zimmerman | 260/29.6 T |
| 3,810,859 | 5/1974 | Mikofalvy | 260/29.6 RW |
| 3,891,591 | 6/1975 | Chang et al. | 260/29.7 W |
| 3,894,980 | 7/1975 | DeTommaso | 260/29.7 W |

FOREIGN PATENT DOCUMENTS 870994  6/1961  United Kingdom.

*Primary Examiner*—Eugene C. Rzucidlo
*Attorney, Agent, or Firm*—Arthur Dresner; Walter C. Kehm

[57] ABSTRACT

Terpolymer emulsions comprising (1) an $\alpha,\beta$-unsaturated carboxylic acid (2) an alkyl ester of an $\alpha,\beta$-unsaturated carboxylic acid, and (3) an amide of an $\alpha,\beta$-unsaturated carboxylic acid or styrene or a derivative thereof of the formula

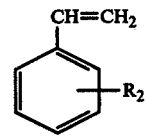

in which $R_2$ is hydrogen, methyl or ethyl are useful as thickening agents, particularly in butadiene-styrene latices.

9 Claims, No Drawings

THICKENING BUTADIENE-STYRENE LATICES WITH TERPOLYMER EMULSIONS

FIELD OF THE INVENTION

This invention relates broadly to emulsion terpolymers prepared from, as monomers, (1) an $\alpha,\beta$-unsaturated carboxylic acid of the formula

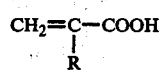
(I)

where R is methyl or ethyl, (2) an ester of an $\alpha,\beta$-unsaturated carboxylic acid of the formula

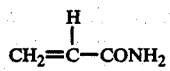
(II)

where $R_1$ is alkyl of from 1 to 8 carbon atoms and $R_2$ is hydrogen, methyl or ethyl, and (3) an amide of an $\alpha,\beta$-unsaturated carboxylic acid of the formula

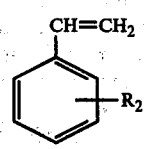
(III)

or an unsaturated aromatic hydorcarbon of the formula

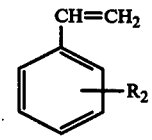
(IV)

There are low viscosity emulsions, useful as thickeners, particularly for butadiene-styrene base synthetic latices.

A preferred embodiment of this invention relates to terpolymers wherein one of the termonomers is an $\alpha,\beta$-unsaturated carboxylic acid amide or styrene; a second monomer is methacrylic acid, and the third termonomer is ethyl acrylate.

DESCRIPTION OF THE PRIOR ART

Various types of thickeners or thickening agents are known in the art. Some, such as those described in U.S. Pat. No. 3,810,859, describe emulsions which contain a small amount (0.5–6%) of an organic acid together with a glycidyl monomer. While such emulsions themselves are said to be thickenable, no doubt via cross-linking, it is not, nevertheless, within the contemplation of this patent to utilize such emulsions to thicken other emulsions.

Other types of thickeners, such as those disclosed in U.S. Pat. No. 3,657,175, involve emulsions entailing a complex formula, e.g. such as one derived from monomers of butadiene, styrene, methacrylic acid, and an ethoxylated alcoholic half ester of maleic acid. However, in order for such emulsions to be stable, butadiene and styrene have to be present, along with the maleic acid half ester, which is itself said to be an essential ingredient.

U.S. Pat. No. 3,035,004 relates broadly to certain copolymers of methacrylic acid and alkyl acrylates containing no more than 56% of methacrylic acid, but does not relate at all to terpolymers. Moreover, the emulsions of U.S. Pat. No. 3,035,004 are prepared by a method, that is entirely different from the one disclosed herein. Therefore, the emulsions resulting from such copolymers are chemically different from those of the present invention, as exemplified by the differences is kind of each of those in respect of their respective viscosities in water, when neutralized to pH 7.0. Accordingly, a copolymer emulsion made by the process of U.S. Pat. No. 3,035,004 with 53/47 methacrylic acid-ethylacrylate monomer ratio, when used at 0.5% concentration, increased the viscosity of water only to 18.5 cps. The result obtained under the same conditions with one of the terpolymers of the invention was 1568 cps — Example II — that is, eighty-five fold higher. Furthermore, the emulsions of U.S. Pat. No. 3,035,004 are latices of poor stability and separate on standing. Therefore, they have to be transformed into water soluble salts in order to be useful. On the other hand, the latices of our invention are of very good mechanical and shelf-stability.

SUMMARY OF THE INVENTION

This invention relates generally to thickening agents and particularly to a method for increasing the viscosity of butadiene-styrene latices by adding thereto an emulsion comprising a terpolymer structure containing the following repeating units:

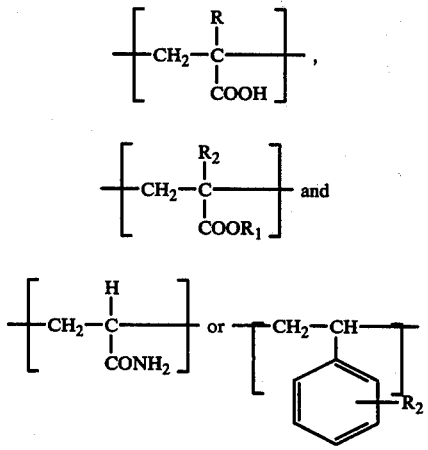

where each R is methyl or ethyl, $R_1$ is alkyl of from 1 to 8 carbon atoms, and $R_2$ is hydrogen, methyl or ethyl. The monomers are, respectively (1) an $\alpha,\beta$-unsaturated carboxylic acid having from 4 to 5 carbon atoms (2) an alkyl ester and preferably, a lower alkyl ester ($C_1$-$C_4$) of an acid defined by (1), and (3) the amide of an acid defined by (1) or styrene or a styrene derivative of the formula

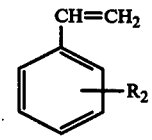

These terpolymer emulsions themselves are of low viscosity but act as thickening agents when added to butadienestyrene latices.

DESCRIPTION OF THE PREFERRED EMBODIMENTS

In a preferred embodiment, the emulsion comprises a terpolymer structure with repeating units, respectively, of (1) methacrylic acid, (2) methyl acrylate or ethyl acrylate, preferably ethyl acrylate, and (3) acrylamide, or styrene or its derivatives such as vinyl toluene, 1-vinyl-4-ethylbenzene and the like.

In a preferred mode of practice of the present invention, the emulsion contains monomer units of at least three different kinds in the following amounts and proportions:

(1) from about 30 percent to about 85 percent, preferably from 50 percent to 70 percent, by weight of an $\alpha,\beta$-monoethylenically unsaturated carboxylic acid of Formula I, preferably methacrylic acid, ethacrylic acid or mixtures thereof with other unsaturated carboxylic acids such as acrylic acid. The amount of such other unsaturated carboxylic acids which can be employed in such mixtures can vary up to about 50% or more of such mixtures depending upon the concentration and hydrophobic nature of the carboxylic acid ester units in the resulting polymer. As the concentration and/or hydrophobic nature of the ester increases, increasing amounts of such other unsaturated carboxylic acids, e.g., acrylic acid, can be employed to the extent that a stable latex can still be obtained.

(2) from about 5 percent to about 50 percent, preferably from 20 percent to 30 percent, by weight, of at least one alkyl ester of Formula II, preferably ethyl acrylate;

(3) from about 0.5 percent to about 20 percent, preferably from 3 percent to 8 percent, by weight of an amide of Formula III, i.e., acrylamide, or an unsaturated aromatic hydrocarbon of Formula IV, preferably styrene. The presence of the amide of the unsaturated aromatic hydrocarbon is an important feature of this invention, since by inclusion of either of these termonomers into the polymer structure, the rheology of systems into which such resultant polymer structure is introduced can be changed drastically, and in an unexpected fashion and degree.

It is to be understood, however, that all the foregoing percentages are based on the total copolymer weight, and they have to total 100%.

Beside the aforedescribed termonomer types, small amounts of some bifunctional, ethylenically unsaturated crosslinking monomer may also be added to the mixture. This monomer has to be capable of polymerizing under free radical conditions so as to covalently bond different chains of the polymer. Polyfunctional monomers, such as divinyl benzene, polyethyleneglycoldimethacrylate, methylene-bis-(acrylamide), etc., are illustrative examples. Other monomers, which can render the polymer curable (through heat-treatments) or otherwise crosslinkable, such as methylolacrylamide, glycidylmethacrylate, epoxybutadiene, etc., can also be used as comonomers.

Chain transfer agents can be used to regulate the average molecular weight of the polymer. Preferred agents are mercaptans such as t-dodecylmercaptan.

The preparation of the terpolymers of this invention is carried out in an emulsion system. The term "emulsion" as used herein, is intended to mean a true colloidal dispersion of the terpolymers in water.

Polymerization is effected in the presence of a catalyst or initiator, preferably one which serves as a thermally activated source of free radicals. Among such catalysts may be mentioned peracetic acid, hydrogen peroxide, persulfates, perphosphates, perborates, percarbonates, etc. The preferred catalyst is ammonium persulfate, as it provides efficient reaction rates and contains a fugitive cation. The amount of initiator used is normally about 0.03 to 3.0 percent, by weight, based on the weight of the total monomers and preferably from 0.25 to 0.5 percent. Preferably the initiator is a redox combination of the water soluble persulfate as the oxidizing component and a hydrosulfite, e.g., sodium hydrosulfite, as the reducing component of the redox combination. Water soluble bisulfites, metabisulfites or thiosulfates, reducing sugars, formaldehyde sulfoxalate, etc., may be used in lieu of the hydrosulfites. Other typical redox combinations, such as sodium azide and ceric ammonium sulfate, titanium trichloride and hydroxylamine, and the like, may also be used. Generally useful proportions of the indicated persulfatehydrosulfite system are 0.01 percent to 1.0 percent for the oxidizing component and 0.015 to 1.5 percent for the reducing component based on the amount of monomers.

The redox combination can be further activated by the presence of polyvalent metal ions at the lower oxidation stage, e.g., ferrous sulfate, cuprous sulfate and the like. The preferred amount of these metal salts may be between 5 ppm and 100 ppm by weight, based on the total amount of the monomers.

The aqueous medium for polymerization contains one or more emulsifiers to help disperse the monomers in the aqueous medium, and to protect the particles formed. Salts of the higher molecular weight sulfonic acids, e.g., alkyl aryl sodium sulfonates, are eminently suitable for the purpose, though other surfactants may also be used with good results.

The amount of surfactant employed can be varied considerably, but ordinarily from about 0.1 percent to about 10 percent, and more particularly from about 0.2 percent to about 1.0 percent, by weight, based on the total weight of the comonomers, will be used. Some additives such as alcohols and the like can also be used in order to help the solubilization of insoluble monomers. The concentration of these materials can be varied between 0.1 percent and 2.0 percent by weight, based on the weight of the comonomers. The emulsion can also contain a small amount of a protective colloid, such as water soluble cellulose derivatives, poly(vinylpyrrolidone), alkali metal polyacrylates, water soluble alginates, and the like. The amount of such a colloid used can range, for example, from about 0.1 percent to about 2 percent and more particularly from about 0.5 percent to 1 percent.

The terpolymer emulsions employed in the present invention typically have from about 15 percent and preferably from about 20 percent to about 50 percent solids content. The average particle size of the emulsion may be from 500 Ångstroms or smaller to about 3000 Ångstroms or greater.

The reaction temperature employed depends, in the first place, on the polymerization catalyst and the monomers used. In general, the polymerization is carried out at a temperature in the range of from 5° C. to 120° C. When the catalyst is a redox system, the recommended initial temperature range is 5° C. to 80° C., advantageously, 15° C. to 60° C.

It is advisable to operate with the exclusion of oxygen, for example under a neutral gas such as nitrogen, argon, and the like. Sometimes it may also be advantageous to run the reaction under elevated or reduced pressure.

The polymerization can be run conveniently by a single stage procedure, whereby all the ingredients are charged to the reactor at the same time. Since the polymerization reaction is exothermic, the initiation thereof can be evidenced by the increasing temperature resulting from addition of the reactants. When the polymerization has proceeded to the extent that the consumption of the monomers is practically complete, the terminal point is indicated by the cessation in the rise of the temperature, followed by a temperature drop. The time period necessary for the aforedescribed operation can range from about 10 minutes to about 2 hours.

The terpolymers of this invention are excellent thickening agents and can influence the viscosity of a variety of systems in an effective and unique way. Not only can they form viscous systems with water based dispersions of materials that are insoluble in the medium, but they can also thicken dilute solutions of organic materials soluble in water, as well as thicken organic materials that are, in and of themselves, miscible with water. Importantly, moreover, they can thicken water itself, that is at a pH of 7.0 and higher, a unique property which may be attributed to the high molecular weight of these polymers. Another property that may contribute to this phenomenon is the uniquely high acid content of the terpolymers. The viscosity of a solution at pH 7.0 which contains as little as 0.5% (total solids basis) of these terpolymers can be as high as 2000 cps or more as compared to a few hundred centipoise viscosities obtained by thickeners made under different circumstances. The unique thickening properties of these terpolymers makes them suitable for a variety of applications.

Only a relatively small amount of the terpolymer latices of the present invention are required to produce significant thickening of the butadiene-styrene latices with which such terpolymers are blended. Such blends can contain from about 0.1 to about 5% of the terpolymer on a total solids basis and preferably, from about 0.5 to about 2% of the terpolymer on a total solids basis.

It is known that textiles used in the manufacturing of broadloom carpets or used as upholstery fabrics can be treated with various materials of which copolymers of butadiene and styrene have previously been found to be the most suitable. The textile that has been treated with such copolymers acquires various excellent properties, for example, built up body, resiliency, tear resistance, abrasion resistance, pleasing "hand", and retention of textile character. However, when the textile is treated in such a way that the coating has to be applied only on one side of the substrate, the viscosity of the coating system has to be increased to an extent such that it does not penetrate through the network formed by the textile fibers. The terpolymers of the present invention are uniquely suited to increasing the viscosity of aqueous dispersions of butadiene-styrene copolymers. In addition to increasing the viscosity of such dispersions, moreover, it is further demanded that the thickener impart a degree of thixotropy, so that the viscosity of the coating decreases during the application, but regains its high value again, after the shear of application disappears. In general, without wishing to be bound or limited by any theory, it can be said that the terpolymers of this invention have been found to perform according to this principle.

It is generally known, for example, that the viscosity of a carboxylic acid polymer can be increased by:
 a. solubilization of the polymer through salt formation, or
 b. swelling of the polymer by hydration of the ion pair.

From these, it might have been concluded by those skilled in the art that the viscosity would, of necessity, have to be a function of the concentration of the carboxylic acid only. However, in the case of the present terpolymers, surprisingly, it was nevertheless found that it was the presence of the acidamide or aromatic hydrocarbon unit that made the terpolymers of this invention so exceptionally active with the butadienestyrene copolymer latices. By way of contrast, systems which did not contain the amide or the aromatic hydrocarbon termonomer showed significantly decreased activity. It is believed that the compatibility of the amide of aromatic hydrocarbon unit with the butadiene-styrene substrate is responsible for the unique behavior of the terpolymers of this invention.

The terpolymers aforedescribed are particularly useful to change the rheological behavior of butadiene-styrene base synthetic latices. However, they can be used also for the thickening of the dispersions of water insoluble and water soluble polymers of all types. Examples of water insoluble dispersions may include natural rubber latices, emulsion polymers of acrylic and vinyl types, as well as their copolymers. Poly(vinylpyrrolidone), poly(acrylamide), poly(vinyl methyl ether), etc., may serve as examples for the thickenable water soluble species. Another important property of the terpolymers of this invention is that they are eminently suitable to increase the viscosity of water itself. That is, to produce high viscosity solutions when dissolved in water, even at very low concentrations.

An important feature of this invention is that its subject polymers can be prepared as low viscosity emulsions and that they can act as "in situ" thickening agents. By the term "in situ" — as it is used herein — is meant that a system of high viscosity can be prepared by adding a low viscosity acid emulsion to a low viscosity alkaline solution or dispersion, and by blending these two ingredients into a uniform system. Of course, the latter ingredient can also be neutral or even slightly acidic in which case, the high viscosity can be achieved by simple adjusting of the pH of the blend above the neutral point. This is a distinct advantage over the use of other known thickening agents, such as salts of acrylic acid, cellulose derivatives, natural gums, etc., which have to be stored and used as high viscosity solutions. Because of the high viscosity of such solutions, they are difficult to handle, and usually demand special equipment to achieve thorough blending with the substrate. By way of contrast to those thickeners, the emulsions of this invention are of very low viscosity (usually on the order of less than 50 cps). Therefore, they can be stored and handled with ease.

While the water soluble polymers and insoluble dispersions that are most preferred for purposes of being thickened by the terpolymer emulsions usable in this invention, are those most conveniently used for the back of upholstery fabrics or carpets, nevertheless such polymers and dispersions can also be used for coating, impregnating, cementing and laminating textiles as well as for dressing, sizing and finishing of paper, leather, felts, and the like. The aqueous solutions and dispersions to be thickened can contain all sorts of other substances conventionally suitable for enhancing the properties of the thickened system, such as fillers, pigments, stabilizers, curing agents, binders, foaming agents, dyes and other such additives. They are applicable also in the thickening of cosmetic preparations such as creams, lotions and hair grooming aids. In addition, moreover, they can also be used as thickening agents for paints, printing inks, detergents and cleaning compositions, and the like.

The terpolymers can be made water soluble through the addition of some base such as sodium hydroxide, ammonium hydroxide and the like. The anionic polyelectrolytes prepared by this fashion are particularly useful thickeners, dye leveling agents, anti-migrants, flocculants, sewage treatment aids, protective colloid agents, drilling mud stabilizers, and in other fields of application.

The following examples are provided to illustrate the principles and practice of the invention. However, it will be understood that these examples are not to be construed as limiting the scope of the present invention in any manner.

In these examples all parts and percentages are by weight, unless otherwise indicated.

EXAMPLE I

Method of Testing

A 400 ml. beaker is tared on an electric toploading balance, and 200 grams of carboxylated butadienestyrene latex (GAF-1400 available from GAF Corporation, Chattanooga, Tennessee) is weighed in it with 0.05 gram accuracy. (The solid content of the latex is 50%). After that, the sample to be tested (for which the solid content of the sample had been determined previously) is weighed in a 100 ml. beaker, under similar conditions. The amount of the sample is made to give exactly 1.0 gram polymer solids. To this sample, distilled water is added to make the total weight of the sample 80.0 grams. The 400 ml. beaker holding the butadiene-styrene latex is placed under an electric stirring apparatus, equipped with a Teflonlined, three blade stirrer of 1¾ inch diameter. The beaker rests on a lab jack in such a way that the tip of the stirrer is 1 inch above the bottom of the beaker. Agitation is started with 800 r.p.m., and the diluted sample is added to the latex within 15 seconds. The agitation is continued for exactly three minutes while moving the beaker slowly up and down to insure good mixing. After that, the beaker is removed and the viscosity of the thickened latex is determined immediately with an LVF Brookfield viscosimeter, using Spindle #4 at 12 r.p.m.

This method was found to give a reproducibility of ±100 centipoises or better.

EXAMPLE II

Preparation of Methacrylic
Acid-Ethylacrylate-Styrene Terpolymer

Apparatus 5 liter resin kettle, equipped with mechanical stirrer, reflux condenser, thermometer and gas inlet tube.

Procedure

Under a blanket of nitrogen, the following ingredients of the reaction were charged, with agitation, in the following order and amounts:
 2823.8 g. distilled water,
 14.3 g. Siponate DS-10, (25% dodecylbenzene sodium sulfonate, Product of Alcolac Co.)
 10.7 g. n-butanol,
 472.0 g. methacrylic acid,
 200.1 g. ethylacrylate,
 42.9 g. styrene,
 0.023 g. divinylbenzene (60%)
 2.85 g. of a 10% ammonium persulfate solution and
 4.77 g. of a 0.1% ferrous sulfate solution.

At this point, the agitation was stopped, and 3.57 g. of a 10% solution of concentrated sodium hydrosulfite (Lykopon available from Rohm & Haas Co.) was introduced. Five minutes later, slow agitation was started, as a slight temperature rise (from 22° C. to 23° C.) signalled that the reaction had already begun. Five minutes later, at 26° C., the speed of the agitation was adjusted to 150 RPM. After that, the temperature rose steadily and peaked in 20 minutes at 52° C. After that, the system was allowed to cool to room temperature, and the product — a free flowing milky latex — was discharged through a 100 mesh screen.

EXAMPLE III

Emulsion terpolymer is prepared by the process described in Example II, except that the termonomer is acrylamide. Ratio of methacrylic acid-ethylacrylate-acrylamide: 66/28/6.

EXAMPLE IV

Emulsion copolymer is prepared by the process described in Example II, except that the emulsion is made without termonomer.

Ratio of methacrylic acid-ethylacrylate 70/30.

EXAMPLE V

Emulsion copolymer is prepared by the process described in Example II, except that the comonomer is methylacrylate instead of ethylacrylate, and the system does not contain termonomer.

Ratio of methacrylic acid-methylacrylate 60/40.

EXAMPLE VI

Emulsion terpolymer is prepared by the process described in Example II, except that the termonomer is vinylacetate.

Ratio of methacrylic acid-ethylacrylate-vinylacetate: 66/28/6.

EXAMPLE VII

Emulsion terpolymer is prepared by the process described in Example II, except that the termonomer is vinylpyrrolidone.

Ratio of methacrylic acid-ethylacrylate-vinylpyrrolidone: 66/28/6.

EXAMPLE VIII

Emulsion terpolymer is prepared by the process described in Example II, except that the termonomer is diethylmaleate.

The ratio of methacrylic acid-ethylacrylate-diethylmaleate: 66/28/6.

EXAMPLE IX

Emulsion terpolymer is prepared by the process described in Example II, except that the termonomer is halfacid ethylmaleate.

Ratio of methacrylic acid-ethylacrylate-termonomer: 66/28/6.

EXAMPLE X

Emulsion terpolymer is prepared by the process described in Example II, except that the termonomer is triethoxy vinyl silane.

Ratio of methacrylic acid-ethylacrylate-termonomer: 66/28/6.

SUMMARY OF THE RESULTS

The emulsions of Examples II–III and Comparative Examples IV–X were compared as to their thickening effect on butadiene-styrene latices. The procedure of Example I was repeated, using r.p.m. of 6, 12, 30 and 60. The results are summarized in the following table which shows Brookfield viscosities in cps:

| Example | II | III | IV | V | VI | VII | VIII | IX | X |
|---|---|---|---|---|---|---|---|---|---|
| (Termonomer Brookfield Viscosity cps. on LVF Sp #4) | Styrene | Acrylamide | None | None | Vinyl-acetate | Vinyl-Pyrrolidone | Diethyl Maleate | Half Acid Ethylnaleate | Triethoxy Vinyl-Silane |
| RPM 6 | 37,000 | 23,300 | 9,700 | 6,500 | 5,720 | 13,500 | 12,200 | 10,000 | 5,800 |
| RPM 12 | 18,600 | 14,000 | 5,500 | 3,750 | 3,430 | 6,950 | 6,800 | 5,800 | 3,600 |
| RPM 30 | 9,150 | 7,000 | 2,600 | 1,900 | 1,800 | 3,520 | 3,360 | 3,010 | 2,900 |
| RPM 60 | 5,170 | 4,150 | 1,500 | 1,170 | 1,120 | 2,010 | 2,050 | 1,880 | 1,650 |
|  | INVENTION | | | | COMPARATIVE EXAMPLES | | | | |

In Examples II, III and Comparative Examples VI–X, the weight ratio of methacrylic acid/ethyl acrylate/termonomer was 66/28/6. In Comparative Example IV, the weight ratio of methacrylic acid/ethyl acrylate was 70/30. In Comparative Example V, the weight ratio of methacrylic acid/methyl acrylate was 60/40.

What is claimed is:

1. A method for thickening butadiene-styrene latices which comprises adding thereto a terpolymer emulsion prepared by inducing in a reactor, at a temperature of from about 5° C. to about 80° C., a redox-initiated polymerization in an aqueous dispersion of, as monomers (1) from about 30 to about 85 wt.% of an α,β-unsaturated carboxylic acid of the formula

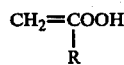

(2) from about 5 to about 50 wt.% of an ester of an α,β-unsaturated carboxylic acid of the formula

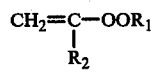

and (3) from about 0.5 to about 20 wt.% of an amide of an α,β-unsaturated acid of the formula

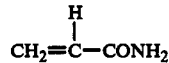

or an unsaturated aromatic hydrocarbon of the formula

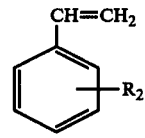

in which each R is methyl or ethyl, $R_1$ is an alkyl of 1 to 8 carbon atoms, and $R_2$ is independently selected from the group consisting of hydrogen, methyl or ethyl; wherein all the ingredients necessary for polymerization are present in the reactor upon initiation of polymerization.

2. A method according to claim 1 in which (1) is methacrylic acid, (2) is methyl acrylate or ethyl acrylate, and (3) is acrylamide or styrene.

3. A method according to claim 2 in which (1) is methacrylic acid, (2) is ethyl acrylate, and (3) is acrylamide or styrene.

4. A method according to claim 1 in which the range of monomer (1) is from 50 to 70 wt. percent, the range of monomer (2) is from 20 to 30 wt. %, and the range of monomer (3) is from 3 to 8 wt. percent.

5. A method according to claim 4 in which monomer (1) is methacrylic acid, monomer (2) is ethyl acrylate, and monomer (3) is acrylamide.

6. A method according to claim 4 in which monomer (1) is methacrylic acid, monomer (2) is ethyl acrylate and monomer (3) is styrene.

7. A method according to claim 1 wherein the terpolymer is blended with the butadiene-styrene latex in an amount of from about 0.1 to about 5% on a total solids basis.

8. A method according to claim 7 wherein the terpolymer is blended with the butadiene-styrene latex in an amount of from about 0.5 to about 2% on a total solids basis.

9. A method according to claim 4 in which the polymerization is initiated by a redox combination catalyst, the total amount of which ranges from about 0.3 to about 3.0 wt.% of the total weight of the monomers.

* * * * *